United States Patent [19]

Pakulak, Jr. et al.

[11] Patent Number: 4,569,287
[45] Date of Patent: Feb. 11, 1986

[54] SUPER SMALL-SCALE COOKOFF BOMB

[75] Inventors: Jack M. Pakulak, Jr.; Susan E. Cragin, both of Ridgecrest, Calif.

[73] Assignee: The United States of America as represented by the Secretary of the Navy, Washington, D.C.

[21] Appl. No.: 621,776

[22] Filed: Jun. 18, 1984

[51] Int. Cl.$^4$ .............................................. G01L 5/14
[52] U.S. Cl. ...................................... 102/293; 73/167
[58] Field of Search .................... 102/293, 481; 73/167

[56] References Cited

PUBLICATIONS

Pakulak, Jr., et al., "NWC Standard Methods for Determining Thermal Properties of Propellants and Explosives," 37 Tech. Pub. 6118, Mar. 1980, pp. 25-28.

*Primary Examiner*—Charles T. Jordan
*Attorney, Agent, or Firm*—Robert F. Beers; W. Thom Skeer

[57] ABSTRACT

Apparatus for predicting the cookoff characteristics of a confined explosive includes a cylindrical housing retained between an instrumentation plate and a witness plate. Small explosive samples contained in sample tubes are inserted within a heat conductive sleeve which is further disposed within the cylindrical housing. Electrical ring heaters are a source of heat the application of which eventually causes the confined explosive to react. Temperature measurements within the housing are obtained utilizing a thermocouple assembly which is inserted through the instrumentation plate and into a groove in the heat conductive sleeve. The degree of damage to the apparatus occasioned by the reaction of the heated explosive predicts the reaction of a full scale ordnance item containing that explosive to exposure to a fire.

7 Claims, 4 Drawing Figures

SUPER SMALL-SCALE COOKOFF BOMB

BACKGROUND OF THE INVENTION

1. Field of the Invention

This invention relates to the explosives arts. More particularly, this invention relates to explosives utilized and confined in ordnance items. With still more particularity this invention relates to the prediction of the reaction of a munition or ordnance item exposed to intense heat such as heat generated in a fuel fire. Finally, this invention relates to a super small-scale cookoff bomb for predicting the time to cookoff and severity of the cookoff reaction of confined explosives such as explosives utilized in ordnance items.

2. Description of the Prior Art

Aircraft carrier deck fires, which are often fed by aviation gasoline, have resulted in substantial loss of life and material damage to these capital ships. The readiness of ships suffering such fires to perform their mission has been degraded to varying degrees. Investigations have shown that aircraft carrier deck fires are exascerbated by the reaction of ordnance items which are often times found on and around aircraft parked and being armed on the aircraft carrier deck when a fire occurs. Fire suppression and fire fighting efforts are inhibited by the explosive behavior of such ordnance items. As a result, the need exists for ongoing efforts to modify the behavior of ordnance items, particularly guided missiles utilized on carrier aircraft, and/or to extend the time of their reaction in a fire.

One aspect of achieving the modification of the behavior of ordnance items subject to fire is the ability to predict cookoff parameters for the explosive confined within the ordnance. Ideally, the ability to predict the response of an ordnance item to a fire includes the ability to predict the reaction of the ordnance explosive to both slow and rapid rates of heating. Slow cookoff reactions and fast cookoff reactions for the same ordnance item can vary greatly in severity.

Previous devices for predicting the time to cookoff and severity of cookoff of ordnance items have necessitated the use of relatively large explosive samples. This relatively large sample amount has often precluded the mixing of the sample in the laboratory environment and has necessitated the existence of a dedicated small-scale processing plant in order to mix the necessary quantity of explosive. Previously utilized cookoff prediction devices, known as bombs to those skilled in the art, have, as a consequence of sample size, been heavy, somewhat unwieldy and have required a significant amount of time and a great deal of care in their assembly. The size and nature of the explosive sample previously utilized resulted in the incorporation of the explosive at a relatively early stage in the assembly of the device complicating both the assembly process and the handling of the device. Additionally, cookoff reaction prediction requires that a large number of tests be run on each explosive. In that cookoff bombs are destroyed during the course of each test, previous devices have proven both expensive and tedious to use. The need therefore exists for a device for predicting the behavior of confined explosives on a scale much smaller than is presently available.

SUMMARY OF THE INVENTION

The invention herein disclosed is a super small-scale cookoff bomb (SSCB) for predicting the thermal behavior of explosives under confined conditions. The device enables the prediction of the time to cookoff and the severity of the cookoff reaction of confined explosives for which there is an empirical relationship between the reaction of a super small-scale explosive sample and the reaction of the amount of explosive confined within an actual ordnance item. The reaction of most explosives has been demonstrated to be scalable to the extent that the reaction of the explosive sample within the SSCB demonstrates the reaction of the same explosive as applied to a full scale ordnance item. By utilizing 1/30 of the amount of the explosive sample utilized in previous test fixtures the device of the present invention enables the explosive sample to be prepared in the laboratory as a pellet within a container tube which is easily inserted into the device when testing is ready to commence.

The SSCB herein described utilizes two 10 gram explosive pellets each packed in a container tube. The explosive container tubes fit slidably within a liner sleeve. The liner sleeve is grooved on its outside surface to accommodate a thermocouple assembly. The container tubes and liner sleeve are inserted into an outer cylindrical housing which is bolted between two disc-shaped metal plates. Electrical ring heaters are placed around the outside housing allowing the explosive sample to be heated.

Temperature data within the device is gathered utilizing the thermocouple assembly. Assessment of the severity of the cookoff reaction is made from the number and condition of housing fragments and the condition of the lower disc-shaped plate of the SSCB which acts as a witness plate.

Cookoff reaction severity is generally classified based upon whether the explosive sample has burned, deflagrated, exploded or detonated. If the heated explosive has merely burned the housing will be found to be unfragmented and the witness plate undisturbed. Deflagration of the explosive sample will result in the housing being fragemented in anywhere from two to four pieces although the witness plate will remain undisturbed. Explosion of the sample will result in the housing being fragmented into many heat discolored and badly deformed pieces. The witness plate, if an explosion has occurred, will be undisturbed or slightly bent if the explosion was a mild one and will be severely bent or dented if the explosion was violent. Detonation of the test sample will again result in the steel housing being broken up into small discolored and deformed pieces. Most characteristically, however, a detonation will result in the witness plate having a hole punched through it.

Witness plate damage is the strongest indication of whether an explosive has undergone a deflagration-to-detonation transition. An essentially unbent, undented witness plate is an indication that the reaction of the confined explosive is not one which would lead to detonation. A bent and/or indented witness plate strongly indicates that the explosive will detonate under conditions of heating similar to those which led to the indentation or bending of the witness plate.

It is an object of this invention to predict the time to cookoff and the severity of the cookoff reaction of confined explosives.

It is a further object of this invention to predict cookoff times and severity for confined explosives under varying rates of heating.

It is another object of this invention to predict cookoff times and severity for confined explosives in a safe and efficient manner.

Still another object of this invention is the safe and efficient prediction of cookoff times and severity of confined explosives on a scale which permits the explosive sample to be produced in a laboratory environment.

These and other objects of the invention will become more readily apparent from the following specification when read in light of the drawing.

DESCRIPTION OF THE PREFERRED EMBODIMENT

Figure 1:
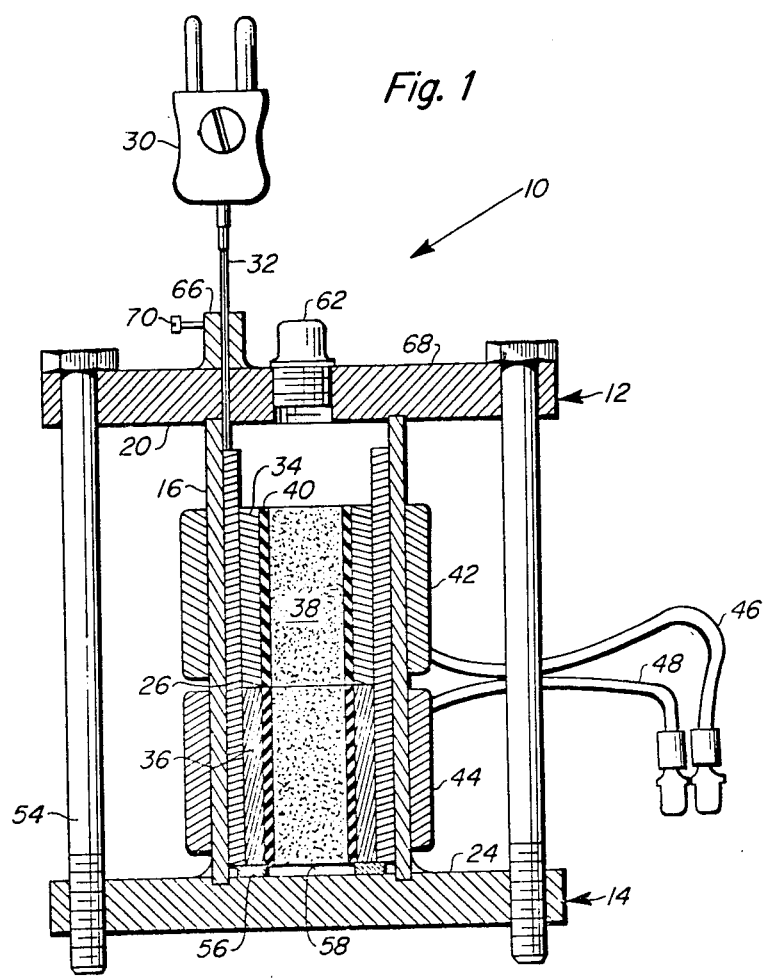
FIG. 1 is a cross-sectional view of the device of the present invention.
Figure 2:
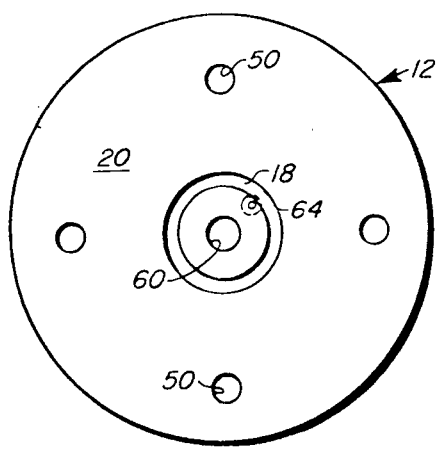
FIG. 2 is an axial view of the inward facing surface of the instrumentation plate of the device.
Figure 3:
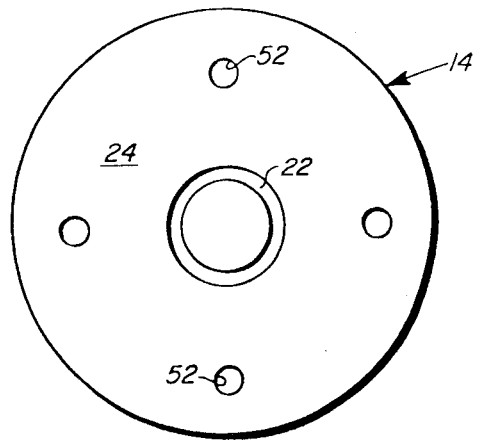
FIG. 3 is an axial view of the inward facing surface of the witness plate of the device.
Figure 4:
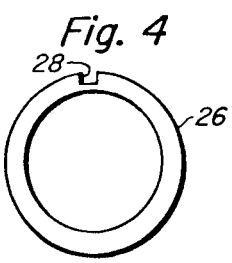
FIG. 4 demonstrates the shape of the cross-section of the liner sleeve of the device.

Referring concurrently to FIGS. 1, 2, 3 and 4 the device of the present invention is readily understood. Super small-scale cookoff bomb (SSCB) 10 includes instrumentation plate 12 and witness plate 14. Instrumentation plate 12 and witness plate 14 are separated and spaced apart by tubular housing 16 which is fabricated from a material such as steel. The ends of housing 16 are accommodated in grooves within the inward facing surfaces of instrumentation plate 12 and witness plate 14. Instrumentation plate 12 defines groove 18 in inward facing surface 20 while witness plate 14 defines groove 22 in inward facing surface 24. Housing 16 may be tack welded to inward facing surface 24 of witness plate 14 after insertion into groove 22 to facilitate assembly of the device.

Tubular sleeve 26 has an outside dimension allowing it to be snugly inserted in a slidable fashion within housing 16. Sleeve 26 defines on its external surface an axially running groove 28. Groove 28 accommodates the temperature sensing portion of thermocouple assembly 30 which includes thermocouple lead portion 32. Sleeve 26 is preferably fabricated from aluminum and acts as a heat sink which evenly distributes heat to an explosive sample contained therein. Mounted within sleeve 26 are upper explosive container tube 34 and lower explosive container tube 36. Container tubes 34 and 36 are made of steel and contain an explosive the cookoff characteristics of which are to be determined. Each container tube accommodates approximately ten grams of explosive material with grain faces of the explosive being exposed at either end of each tube. The exact weight of the explosive sample varies according to the particular explosive to be tested and its density. Explosive material 38 is packed within tubes 34 and 36 in a conventional manner such as by pressing or casting.

Container tubes 34 and 36 may include liner material 40 on their inner surfaces which functions as a thermal barrier. Most ordnance items include a liner disposed around the high explosive fill indicating that the prediction of ordnance cookoff times and severity will be more accurately accomplished when such a liner is utilized. The effect of utilizing a liner material on cookoff parameters can be determined by comparing cookoff test results for individual explosive samples with and without the liner material in place.

The heating of explosive material 38 is accomplished by the application of electric current to electric ring heaters 42 and 44 which are slidably disposed over housing 16. Heaters 42 and 44, which fit snugly around housing 16, are capable of supplying heat to housing 16 at varying rates determined by the voltage applied to heater leads 46 and 48. Application of different voltages simulates the different conditions and rates of heating which an ordnance item might undergo in an actual fire.

Instrumentation plate 12 defines holes 50 which are spaced apart equally at a predetermined distance from the center of plate 12. Likewise, witness plate 14 defines holes 52, equal in number and spaced identically as compared to holes 50 in instrumentation plate 12. While holes 50 in instrumentation plate 12 are unthreaded, holes 52 in witness plate 14 are threaded holes. SSCB 10 is held together by bolts 54 which, in the assembled device, are inserted through holes 52 in instrumentation plate 12 and are threaded into and through threaded holes 52 of witness plate 14.

SSCB 10 includes a stand-off washer 56 which acts to prevent sleeve 26 and lower explosive container tube 36 from resting directly on witness plate 14. The use of stand-off washer 56 to separate explosive material 38 contained in lower explosive container tube 36 from inward facing surface 24 of witness plate 14 provides a space 58 through which the shock wave, if any, produced by the reaction of the explosive sample being heated must pass prior to effecting witness plate 14. Standoff washer 56 acts to shape a shockwave passing through space 58. Space 58 and the affect of its existence on the degree of damage to witness plate 14 facilitates the determination of the nature of the cookoff reaction which occurs within SSCB 10, particularly if a detonation has occurred. The hole in the center of washer 56 is of a larger diameter than the diameter of the exposed grain face of the explosive undergoing test. Washer 56 has a outside diameter making it essentially selfcentering within housing 16.

Instrumentation plate 12 defines a threaded axial hole 60 at its center. This hole gives access to the interior of the assembled SSCB and may be utilized for the emplacement of additional instrumentation. Under circumstances when the use of additional instrumentation is not desired hole 60 is plugged with threaded plug 62.

Instrumentation plate 12 also defines axially running thermocouple lead access hole 64 which is located at a radial distance from the center of instrumentation plate 12 such that thermocouple lead 32 when threaded through hole 64 protrudes out of inward facing surface 20 immediately inside of groove 18 in inward facing surface 20. This radial distance coincides with the radial distance at which groove 28 is located from the axis of sleeve 26. The location of thermocouple lead access hole 64 in instrumentation plate 12 allows for the introduction of thermocouple lead 32 into the interior of the SSCB at a point directly opposite groove 28 in sleeve 26. A cylindrical nub 66 defining an axial passage equal in diameter to hole 64 is welded to instrumentation plate 12 such that the nub hole and thermocouple access lead hole 64 are in axial alignment. Nub 66 includes screw 70 which moves radially with respect to the axis of nub 66 to facilitate the positioning and securing of thermocouple assembly 30 within SSCB 10.

It has been noted that SSCB 10 is significant, in addition to the structure set forth above, for the small size of the explosive sample it utilizes to accomplish the prediction of the cookoff characteristics of certain confined explosives. The sample size utilized within SSCB 10, which is nominally 20 grams, is contained, in the preferred embodiment, in two 10 gram explosive container tubes. A nominal 20 grams of explosive will be contained in a volume defined by the two container tubes which is less than one cubic inch. An explosive sample which is contained within a volume less than one cubic inch has proven extremely convenient to work with both from the standpoint of fabricating the explosive sample and in conducting the actual cookoff test. Whereas previous devices utilized relatively large, explosive samples to accomplish cookoff reaction prediction, the structure of SSCB 10 when utilized with a nominal 20 gram explosive sample permits accurate cookoff reaction prediction to be accomplished in a safe, economical and convenient manner. Until SSCB 10 was developed no satisfactory apparatus was known to exist for the accomplishment of cookoff reaction prediction for confined explosives utilizing an explosive sample of the extremely small size herein described.

The foregoing description in conjunction with the appended claims constitutes a disclosure such as to enable the invention to be made and used by those skilled in the explosives arts. Further, the structure herein described meets the objectives of the invention and constitutes a meritorious advance in the art unobvious to persons not having the benefit of the teachings contained herein.

Obviously, many modifications and variations of the present invention are possible in light of the above teachings and it is therefore to be understood that within the scope of the disclosed inventive concept, the invention may be practiced other than as specifically described.

We claim:

1. Apparatus for predicting cookoff characteristics for a confined explosive comprising:
    a tubular housing;
    a witness plate, said witness plate having an inward facing surface and defining an annular groove in said inward facing surface, said groove accommodating the insertion of one end of said tubular housing;
    an instrumentation plate, said instrumentation plate having an inward facing surface and defining an annular groove in said inward facing surface, said groove accommodating the insertion of the end of said tubular housing opposite said one end accommodated in said witness plate groove;
    a heat conductive sleeve slidably disposed within said housing, the exterior surface of said sleeve contacting the interior surface of said housing;
    means for containing an explosive, said containing means slidably disposed within said heat conductive sleeve;
    means for separating said explosive containing means and an explosive contained therein from said inward facing surface of said witness plate, said separating means defining a void between an explosive contained within said explosive containing means and said inward facing surface of said witness plate;
    means for securing said housing between said instrumentation plate and said witness plate with one end of said housing accommodated in said witness plate groove and said end of said housing opposite said one end accommodated in said witness plate groove accommodated within said instrumentation plate groove;
    means for applying heat to an explosive contained in said explosive containing means; and
    means for sensing temperature at a predetermined location within said housing.

2. The apparatus according to claim 1 wherein said explosive containing means is an open-ended tube, the exterior surface of said tube contacting the interior surface of said heat conductive sleeve, one exposed face of an explosive contained within said tube communicating directly with said inward facing surface of said witness plate through said void defined by said means for separating said explosive containing means from said inward facing surface of said witness plate.

3. The apparatus according to claim 2 wherein:
    said sleeve defines a groove located in and running axially with respect to said exterior surface of said sleeve; wherein,
    said instrumentation plate is a disc-shaped plate defining an axial access hole, said access hole located in said plate to provide communication from a location within said annular groove on said inward facing surface of said instrumentation plate to a location on the surface of said instrumentation plate opposite said inward facing surface; and, wherein,
    said means for sensing temperatures at a predetermined location within said housing is a thermocouple assembly, said thermocouple assembly including a temperature sensing portion connected to a lead portion, said temperature sensing portion fits slidably into said groove in said sleeve and said lead portion running out of said groove in said sleeve, into and through said access hole defined by said instrumentation plate.

4. The apparatus according to claim 3 wherein said housing is a metal housing and said means for applying heat to an explosive contained in said container tube comprises means for applying heat to the exterior surface of said metal housing at more than one heating rate.

5. The apparatus according to claim 4 wherein said explosive container tube is a metal tube and said means for applying heat to the exterior surface of said metal housing is an electrical ring heater slidably disposed over and contacting said exterior surface of said metal housing, heat produced by said ring heater being conducted through said housing, into and through said sleeve and into and through said metal explosive container tube, said sleeve acting as a heat sink and evenly distributing heat to said explosive container tube and thence to an explosive contained within said tube.

6. The apparatus according to claim 5 further comprising a thermal barrier material, said thermal barrier material applied to the interior surface of said explosive container tube and interposed between said container tube and an explosive contained within said container tube.

7. The apparatus according to claim 2 wherein the volume for containing an explosive sample within said container tube is less than one cubic inch.

* * * * *